(12) United States Patent
Mitadera et al.

(10) Patent No.: US 8,603,600 B2
(45) Date of Patent: Dec. 10, 2013

(54) POLYAMIDE RESIN COMPOSITIONS

(75) Inventors: Jun Mitadera, Kanagawa (JP); Masashi Kurokawa, Kanagawa (JP); Takahiro Takano, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/702,865

(22) PCT Filed: Jul. 4, 2011

(86) PCT No.: PCT/JP2011/065260
§ 371 (c)(1),
(2), (4) Date: Dec. 7, 2012

(87) PCT Pub. No.: WO2012/005204
PCT Pub. Date: Jan. 12, 2012

(65) Prior Publication Data
US 2013/0078402 A1 Mar. 28, 2013

(30) Foreign Application Priority Data

Jul. 8, 2010 (JP) ................................. 2010-155405
Jul. 23, 2010 (JP) ................................. 2010-165718

(51) Int. Cl.
*B29D 22/00* (2006.01)
*B29D 23/00* (2006.01)
*B32B 1/08* (2006.01)

(52) U.S. Cl.
USPC ... 428/35.7; 428/36.9; 428/36.92; 428/474.4; 428/475.5; 525/432; 524/227; 524/538; 524/186

(58) Field of Classification Search
USPC .............. 428/36.9, 35.7, 36.92, 474.4, 475.5; 525/432; 524/227, 538, 186
See application file for complete search history.

(56) References Cited

U.S. PATENT DOCUMENTS

| 4,822,846 A | 4/1989 | Nomura et al. |
| 2010/0004406 A1 | 1/2010 | Sato |

FOREIGN PATENT DOCUMENTS

| JP | 59-27948 A | 2/1984 |
| JP | 63-137955 A | 6/1988 |
| JP | 3-106646 A | 5/1991 |
| JP | 4-198329 A | 7/1992 |
| JP | 11-71455 A | 3/1999 |
| JP | 2006-297894 A | 11/2006 |
| JP | 2008-133455 A | 6/2008 |
| JP | 2011-105822 A | 6/2011 |

OTHER PUBLICATIONS

U.S. Appl. No. 13/824,027, filed Mar. 15, 2013, Mitadera, et al.
U.S. Appl. No. 13/822,152, filed Mar. 11, 2013, Mitadera, et al.
U.S. Appl. No. 13/809,499, filed Jan. 10, 2013, Mitadera, et al.
Internatioanal Search Report and Written Opinion issued Sep. 20, 2011, in PCT/JP2011/065260, filed Jul. 4, 2011, with English translation of the International Search Report.
International Preliminary Report on Patentability and Written Opinion issued Feb. 21, 2013 in Application No. PCT/JP2011/065260.
Office Action issued Apr. 11, 2013, in Australian Patent Application No. 2011275035.

*Primary Examiner* — Michael C Miggins
(74) *Attorney, Agent, or Firm* — Oblon, Spivak, McClelland, Maier & Neustadt, L.L.P.

(57) ABSTRACT

[Problems]
Provided is a polyamide resin material having high elastic modulus, good gas barrier properties, low water absorption and excellent flexibility.
[Means for solving the problems]
This is a polyamide resin composition comprising a polyamide resin (A) composed of a diamine structural unit and a dicarboxylic acid structural unit wherein 70 mol % or more of the diamine structural unit is derived from xylylenediamine and 50 mol % or more of the dicarboxylic acid structural unit is derived from sebacic acid, and 1 to 40 parts by mass of at least one copolyamide (B) selected from the following group consisting of (B-1)-(B-3) per 100 parts by mass of the polyamide resin (A);
(B-1): a copolyamide 6/66/12;
(B-2): a copolyamide 6/66/11;
(B-3): a polyether-polyamide copolymer composed of a polyamide 12 unit or a polyamide 11 unit and a polyether unit.

20 Claims, No Drawings

POLYAMIDE RESIN COMPOSITIONS

TECHNICAL FIELD

The present invention relates to polyamide resin compositions, specifically polyamide resin compositions having high elastic modulus, good gas barrier properties, low water absorption and excellent flexibility.

BACKGROUND ART

Polyamide resins are generally widely used as engineering plastics having excellent mechanical properties, chemical resistance, oil resistance, gas barrier properties and the like. A polyamide resin obtained by polymerizing m-xylylenediamine and adipic acid (hereinafter sometimes referred to as "MXD6 polyamide") is widely used because it has higher strength, higher elastic modulus, lower water absorption and better gas barrier properties as compared with polyamide 6 and polyamide 66 and the like so that it can be further coextruded or coinjection-molded with thermoplastic resins such as polyethylene terephthalate, polyamide 6, polyethylene and polypropylene.

However, MXD6 polyamide has high elastic modulus but poor elongation so that films or sheets or the like made from it are too hard to use for applications requiring elongation though they can be used for applications requiring rigidity. It also had the disadvantage that it opacifies/crystallizes and tends to lose transparency during storage in a high humidity atmosphere or upon contact with water or boiling water. No polyamide resin having high elastic modulus and flexibility has hitherto been found.

In patent document 1, the inventors proposed a composition comprising a mixture of MXD6 polyamide with another specific aliphatic polyamide resin having high crystallization speed (e.g., polyamide 6). Films or sheets obtained from this polyamide resin composition are advantageously characterized in that the polyamide resin composition keeps excellent transparency even in a high humidity atmosphere, but disadvantageously showed an increase in water absorption and lower gas barrier properties due to the combination with another polyamide resin as compared with MXD6 polyamide alone. Further, flexibility was insufficient for use in applications requiring softness.

On the other hand, a polyamide resin obtained by polycondensing m-xylylenediamine with sebacic acid (hereinafter sometimes referred to as "MXD10 polyamide") was proposed and expected for use in such fields as films because the polyamide resin has better elongation properties as compared with MXD6 polyamide. However, the resulting films showed a certain level of elongation but insufficient elongation and further improvements have been required for preparing films, sheets, tubes and the like.

REFERENCES

Patent Documents

Patent document 1: JPA H4-198329

DISCLOSURE OF THE INVENTION

Problems to be Solved by the Invention

Under the circumstances described above, an object of the present invention is to provide polyamide resin compositions having high elastic modulus, good gas barrier properties, low water absorption and excellent flexibility.

Means for Solving the Problems

As a result of careful studies to attain the above object, we accomplished the present invention on the basis of the finding that a polyamide resin composition fulfilling the above object can be obtained by incorporating a specific amount of a copolyamide (B) selected from a copolyamide 6/66/12, a copolyamide 6/66/11 and a specific polyether-polyamide copolymer into a polyamide resin made from xylylenediamine and sebacic acid (hereinafter sometimes referred to as "XD10 polyamide").

Thus, a first aspect of the present invention provides a polyamide resin composition comprising a polyamide resin (A) composed of a diamine structural unit and a dicarboxylic acid structural unit wherein 70 mol % or more of the diamine structural unit is derived from xylylenediamine and 50 mol % or more of the dicarboxylic acid structural unit is derived from sebacic acid, characterized in that it further comprises 1 to 40 parts by mass of at least one copolyamide (B) selected from the group consisting of (B-1)-(B-3) below per 100 parts by mass of the polyamide resin (A).
(B-1): a copolyamide 6/66/12;
(B-2): a copolyamide 6/66/11;
(B-3): a polyether-polyamide copolymer composed of a polyamide 12 unit or a polyamide 11 unit and a polyether unit.

A second aspect of the present invention provides the polyamide resin composition according to the first aspect characterized in that the xylylene diamine is m-xylylenediamine, p-xylylenediamine or a mixture thereof.

A third aspect of the present invention provides the polyamide resin composition according to the first aspect characterized in that the polyamide resin (A) is a polyamide resin obtained by polycondensing m-xylylenediamine, p-xylylenediamine or a mixture thereof with sebacic acid.

A fourth aspect of the present invention provides the polyamide resin composition according to the first aspect characterized in that it further contains 0.1 to 2 parts by mass of a carbodiimide compound (C) per 100 parts by mass of the polyamide resin (A).

A fifth aspect of the present invention provides the polyamide resin composition according to the fourth aspect characterized in that the carbodiimide compound (C) is an aliphatic or alicyclic polycarbodiimide compound.

A sixth aspect of the present invention provides the polyamide resin composition according to the first aspect characterized in that it further contains 0.01 to 1 parts by mass of a stabilizer (D) per 100 parts by mass of the polyamide resin (A).

A seventh aspect of the present invention provides the polyamide resin composition according to the sixth aspect characterized in that the stabilizer (D) is selected from an inorganic stabilizer, a secondary aromatic amine stabilizer or an organic sulfur stabilizer.

An eighth aspect of the present invention provides the polyamide resin composition according to the first aspect characterized in that a film formed of the polyamide resin composition exhibits a tensile modulus of elasticity (E) corresponding to 70 to 97% of the tensile modulus of elasticity $(E_A)$ of a film formed of the polyamide resin (A).

A ninth aspect of the present invention provides a molded article formed by molding the polyamide resin composition according to any one of the first to eighth aspects.

A tenth aspect of the present invention provides the molded article according to the ninth aspect characterized in that the molded article is a film, sheet or tube.

ADVANTAGES OF THE INVENTION

The present invention is based on the finding that an XD10 polyamide resin (A) is specifically highly compatible with (B-1) a copolyamide 6/66/12, (B-2) a copolyamide 6/66/11 and (B-3) a polyether-polyamide copolymer composed of a polyamide 12 unit or a polyamide 11 unit and a polyether unit and that polyamide resin materials having excellent elastic modulus, very high tensile elongation, flexibility, excellent gas barrier properties and also excellent transparency can be surprisingly achieved by incorporating a specific amount in the range of 1 to 40 parts by mass of these copolyamides (B) per 100 parts by mass of the XD10 polyamide. According to the present invention, polyamide resin compositions having high elastic modulus, good gas barrier properties, low water absorption and excellent flexibility can be obtained. Especially, excellent transparency can be achieved when the (B-1) copolyamide 6/66/12 or (B-2) copolyamide 6/66/11 is mixed with the XD10 polyamide resin (A).

Especially, molded articles obtained by using the polyamide resin compositions of the present invention have a level of flexibility that could not be achieved by conventional techniques so that the polyamide resin compositions can be expected for use as films, sheets or tubes and the like in various applications.

The polyamide resin compositions of the present invention provide polyamide resin materials having excellent elastic modulus and gas barrier properties, low water absorption and also excellent flexibility so that the polyamide resin composition can be conveniently used for a wide variety of moldings including various films, sheets, laminated films, laminated sheets, tubes, hoses, pipes, various containers such as hollow containers and bottles, various parts and the like.

THE BEST MODE FOR CARRYING OUT THE INVENTION

The polyamide resin (A) used in polyamide resin compositions of the present invention is a polyamide resin comprising a diamine structural unit (a structural unit derived from a diamine) and a dicarboxylic acid structural unit (a structural unit derived from a dicarboxylic acid), wherein 70 mol % or more of the diamine structural unit is derived from xylylenediamine and 50 mol % or more of the dicarboxylic acid structural unit is derived from sebacic acid.

The polyamide resin (A) is obtained by polycondensing a diamine component containing 70 mol % or more, preferably 80 mol % or more of xylylenediamine with a dicarboxylic acid component containing 50 mol % or more, preferably 70 mol % or more, more preferably 80 mol % or more of sebacic acid.

If xylylenediamine is less than 70 mol % here, the finally obtainable polyamide resin composition has insufficient barrier properties, and if sebacic acid is less than 50 mol %, the polyamide resin composition is rigid and poor in processability.

The xylylenediamine used is preferably m-xylylenediamine, p-xylylenediamine or a mixture thereof. The mixture can be used in any ratio, but preferably consists of 0 to 50 mol % of m-xylylenediamine and 50 to 100 mol % of p-xylylenediamine in the case where the importance is attached to heat resistance; and preferably consists of 50 to 100 mol % of m-xylylenediamine and 0 to 50 mol % of p-xylylenediamine when the importance is attached to moldability into the films.

Examples of diamines other than xylylenediamine used as starting diamine components of the polyamide resin (A) may include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decane (including structural isomers thereof) and bis(aminomethyl)tricyclodecane (including structural isomers thereof); diamines having an aromatic ring such as bis(4-aminophenyl)ether, p-phenylenediamine and bis(aminomethyl)naphthalene (including structural isomers thereof); and they can be used alone or as a mixture of two or more of them.

When a diamine other than xylylenediamine is used as a diamine component, it should be used at a proportion of less than 30 mol %, preferably 1 to 25 mol %, especially preferably 5 to 20 mol % of the diamine structural unit.

Sebacic acid used as a starting dicarboxylic acid component of the polyamide resin (A) should be used at 50 mol % or more, preferably 70 mol % or more, more preferably 80 mol % or more.

Starting dicarboxylic acid components other than sebacic acid that can preferably be used are straight chain aliphatic α,ω-dicarboxylic acids containing 4 to 20 carbon atoms other than sebacic acid, examples of which include, for example, succinic acid, glutaric acid, pimelic acid, suberic acid, azelaic acid, adipic acid, undecanoic diacid, dodecanoic diacid and the like, and they can be used alone or as a mixture of two or more of them, among the dicarboxylic acid components other than sebacic acid, adipic acid is especially preferred because the melting point of the resulting polyamide resin becomes in a range appropriate for molding.

Aromatic dicarboxylic acids can also be used as dicarboxylic acid components other than sebacic acid, examples of which include phthalic acid compounds such as isophthalic acid, terephthalic acid and orthophthalic acid; and isomeric naphthalenedicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid; and the dicarboxylic acid components other than sebacic acid can be used alone or as a mixture of two or more of them.

Monocarboxylic acids such as benzoic acid, propionic acid and butyric acid; polycarboxylic acids such as trimellitic acid and pyromellitic acid; carboxylic anhydrides such as trimellitic anhydride and pyromellitic anhydride and the like can also be used.

When a dicarboxylic acid other than a straight chain aliphatic α,ω-dicarboxylic acids containing 4 to 20 carbon atoms is used as a dicarboxylic acid component other than sebacic acid, isophthalic acid is preferable because of moldability and barrier properties. The proportion of isophthalic acid is less than 30 mol %, preferably 1 to 25 mol %, especially preferably 5 to 20 mol % of the dicarboxylic acid structural unit.

The polyamide resin (A) is obtained by polycondensing a diamine component containing 70 mol % or more of xylylenediamine and a dicarboxylic acid component containing 50 mol % or more of sebacic acid using any of previously known processes and polymerization conditions, such as, but not specifically limited to, atmospheric pressure melt polymerization, high pressure melt polymerization and the like.

For example, the polyamide resin (A) is prepared by heating a polyamide salt composed of xylylenediamine and sebacic acid in the presence of water under pressure, and polymerizing them in a molten state while removing the water added and condensed water. The polyamide resin (A) may also be prepared by directly adding xylylenediamine to sebacic acid in a molten state and polycondensing them under atmospheric pressure. In the latter case, polycondensation proceeds by continuously adding xylylenediamine while heating the reaction system to a reaction temperature equal to or higher than the melting points of the oligoamide and polyamide produced to prevent the reaction system from solidifying.

When the polyamide resin (A) is to be obtained by polycondensation, lactams such as ε-caprolactam, ω-laurolactam and ω-enantolactam; amino acids such as 6-aminocaproic acid, 7-aminoheptanoic acid, 11-aminoundecanoic acid, 12-aminododecanoic acid, 9-aminononanoic acid and p-aminomethylbenzoic acid and the like may be added to the polycondensation reaction system so far as the performance is not affected.

The polyamide (A) can also be used after it is further heat-treated to increase the melt viscosity.

Heat treatment methods include, for example, gently heating in the presence of water in an inert gas atmosphere or under reduced pressure using a batch heater such as a rotating drum to induce crystallization while avoiding fusion, and then further heating; or heating in an inert gas atmosphere using a groove stirrer/heater to induce crystallization, and then heating in an inert gas atmosphere using a hopper shape-heater; or using a groove stirrer/heater to induce crystallization, and then heating with a batch heater such as a rotating drum.

Especially, it is preferable to perform crystallization and heat treatment by using a batch heater. Preferred crystallization conditions are as follows: heating the polyamide resin obtained by melt polymerization to 70 to 120° C. over 0.5 to 4 hrs in the presence of 1 to 30% by mass of water to crystallize the polyamide resin, then heating the crystallized resin at a temperature in the range from [the melting point of the polyamide resin obtained by melt polymerization minus 50° C.] to [the melting point of the polyamide resin obtained by melt polymerization minus 10° C.] for 1 to 12 hrs in an inert gas atmosphere or under reduced pressure.

The melting point of the polyamide resin (A) is preferably controlled in the range of 150 to 310° C., more preferably 160 to 300° C., even more preferably 170 to 290° C. The melting point is preferably in the ranges above because processability tends to improve.

On the other hand, the glass transition point of the polyamide resin (A) is preferably in the range of 50 to 130° C. The glass transition point is preferably in the range above because barrier properties tend to improve.

As used herein, the melting points and glass transition points of the polyamide resin (A) and the copolyamides (B-1)-(B-3) described below refer to the melting points and glass transitions that can be determined by differential scanning calorimetry (DSC) by melting a specimen by heating it once to eliminate the influence of heat history on crystallinity and then heating it again. Specifically, a specimen is heated at a rate of 10° C./min from 30° C. to a temperature equal to or higher than an expected melting point, and held at that temperature for 2 min and then cooled at a rate of 20° C./min to 30° C. Then, the specimen is heated at a rate of 10° C./min to a temperature equal to or higher than the melting point, whereby the melting point and the glass transition point can be determined.

The polyamide resin (A) is conveniently used when it preferably has a terminal amino group concentration of less than 100 μeq/g, more preferably 5 to 75 μeq/g, even more preferably 10 to 50 μeq/g, and a terminal carboxyl group concentration of preferably less than 100 μeq/g, more preferably 10 to 90 μeq/g, even more preferably 10 to 50 μeq/g. The polyamide resin having a terminal amino group concentration and a terminal carboxyl group concentration in the ranges above tend to readily react with carbodiimide compounds and to have better hydrolysis resistance. The polyamide resin (A) preferably has a relative viscosity of 1.7 to 4, more preferably 1.9 to 3.8 when determined at a resin concentration of 1 g/100 cc in 96% sulfuric acid at a temperature of 25° C.

The number average molecular weight of the polyamide resin (A) is preferably 6,000 to 50,000, more preferably 10,000 to 43,000. When it is in the ranges above, mechanical strength and moldability tend to improve.

The polyamide resin (A) may contain a phosphorus compound to improve processing stability during melt molding or to prevent discoloration of the polyamide resin. Phosphorus compounds containing an alkali metal or alkaline earth metal are conveniently used, including for example phosphate salts, hypophosphite salts and phosphite salts of sodium, magnesium, calcium and the like. Among them, hypophosphite salts of alkali metals or alkaline earth metals are preferably contained because they are especially useful for preventing coloration of the polyamide resin. When a phosphorus compound is used, it is desirably contained in the polyamide resin (A) at 200 ppm or less, preferably 160 ppm or less, even more preferably 100 ppm or less expressed as the phosphorus atom concentration in the polyamide resin composition (A).

In addition to the phosphorus compounds described above, the polyamide resin (A) may further contain various materials including, but not limited to, additives such as lubricants, matting agents, heat stabilizers, weather stabilizers, UV absorbers, nucleating agents, plasticizers, flame retardants, antistatic agents, coloration inhibitors, anti-gelling agents and the like so far as the benefits of the present invention are not affected.

In the present invention, the polyamide resin (A) is combined with (B-1) a copolyamide 6/66/12, (B-2) a copolyamide 6/66/11 or (B-3) a polyether-polyamide copolymer composed of a polyamide 12 unit or a polyamide 11 unit and a polyether unit.

The copolyamide 6/66/12 (B-1) is a ternary or polynary copolyamide comprising a polyamide 6 unit (caproamide unit) and a polyamide 66 unit (hexamethylene adipamide unit) and a polyamide 12 unit (dodecanamide unit).

The copolyamide 6/66/12 (B-1) can be obtained by copolymerizing a polyamide 6-forming component such as caprolactam, a polyamide 66-forming component such as hexamethylenediamine and adipic acid, and a polyamide 12-forming component such as 12-aminododecanoic acid or dodecanelactam, and optionally other materials to be polycondensed.

The copolyamide 6/66/12 (B-1) preferably has a copolymerization ratio consisting of 60 to 95% by mass, more preferably 70 to 90% by mass, even more preferably 75 to 85% by mass of a polyamide 6 unit; 0.5 to 25% by mass, more preferably 1 to 20% by mass, even more preferably 5 to 15% by mass of a polyamide 66 unit; and 0.5 to 25% by mass, more preferably 1 to 15% by mass, even more preferably 3 to 10% by mass of a polyamide 12 unit. When the copolyamide 6/66/12 (B-1) has a copolymerization ratio in the ranges above, it becomes highly compatible with the polyamide resin (A) and tends to readily provide resin compositions having excellent transparency, flexibility and the like.

The copolyamide 6/66/12 (B-1) may not be limited to a terpolymer, but may be a quaternary or polynary copolymer further containing other polymer units.

Such polyamide components preferably include aliphatic amide components such as polyamide 11 (polyundecanamide), polyamide 9 (poly-ω-aminononanoic acid), polyamide 46 (polytetramethylene adipamide), polyamide 610 (polyhexamethylene sebacamide), etc.

Copolymers containing aromatic dicarboxylic acid components such as terephthalic acid and isophthalic acid or aromatic diamine components such as xylylenediamine may also be included.

The process for preparing the copolyamide 6/66/12 is not limited, but previously known processes can be applied. Polymerization can be performed by repeating atmospheric pressure, reduced pressure and applied pressure processes using known techniques such as melt polymerization, solution polymerization, solid state polymerization and the like.

For example, the lactam component, diamine component and dicarboxylic acid component described above or salts thereof are heated with water to 180 to 220° C. in an autoclave, held under pressure for a predetermined period to induce amidation, then returned to atmospheric pressure, heated again to 210 to 260° C., and held at that temperature for a predetermined period, after which the copolyamide can be obtained.

The copolyamide 6/66/12 is commercially available, and can be appropriately selected from these commercial products.

The copolyamide 6/66/11 (B-2) used in the present invention is a ternary or polynary copolyamide comprising a polyamide 6 unit (caproamide unit) and a polyamide 66 unit (hexamethylene adipamide unit) and a polyamide 11 unit (undecanamide unit).

The copolyamide 6/66/11 (B-2) can be obtained by copolymerizing a polyamide 6-forming component such as caprolactam, a polyamide 66-forming component such as hexamethylenediamine and adipic acid, and a polyamide 11-forming component such as 11-aminoundecanoic acid or undecanelactam, and optionally other materials to be polycondensed.

The copolyamide 6/66/11 (B-2) preferably has a copolymerization ratio consisting of 60 to 95% by mass, more preferably 70 to 90% by mass, even more preferably 75 to 85% by mass of a polyamide 6 unit; 0.5 to 25% by mass, more preferably 1 to 20% by mass, even more preferably 5 to 15% by mass of a polyamide 66 unit; and 0.5 to 25% by mass, more preferably 1 to 15% by mass, even more preferably 3 to 10% by mass of a polyamide 11 unit. When the copolyamide 6/66/11 (B-2) has a copolymerization ratio in the ranges above, it becomes highly compatible with the polyamide resin (A) and tends to readily provide resin compositions having excellent transparency, flexibility and the like.

The copolyamide 6/66/11 (B-2) may not be limited to a terpolymer, but may be a quaternary or polynary copolymer further containing other polymer units.

Such polyamide components preferably include aliphatic amide components such as polyamide 12 (polydodecanamide), polyamide 9 (poly-ω-aminononanoic acid), polyamide 46 (polytetramethylene adipamide), polyamide 610 (polyhexamethylene sebacamide), etc.

Copolymers containing aromatic dicarboxylic acid components such as terephthalic acid and isophthalic acid or aromatic diamine components such as xylylenediamine may also be included.

The process for preparing the copolyamide 6/66/11 is not limited, but previously known processes can be applied. Polymerization can be performed by repeating atmospheric pressure, reduced pressure and applied pressure processes using known techniques such as melt polymerization, solution polymerization, solid state polymerization and the like.

For example, the lactam component, diamine component and dicarboxylic acid component described above or salts thereof are heated with water to 180 to 220° C. in an autoclave, held under pressure for a predetermined period to induce amidation, then returned to atmospheric pressure, heated again to 210 to 260° C., and held at that temperature for a predetermined period, after which the copolyamide can be obtained.

The polyether-polyamide copolymer (B-3) composed of a polyamide 12 unit or a polyamide 11 unit and a polyether unit used in the present invention mainly consists of a polyamide 12 unit (dodecanamide unit) or a polyamide 11 unit (undecanamide unit) and a polyether unit such as polyoxyalkylene glycol. Typically, it mainly consists of 15 to 90% by mass of a polyamide unit containing a polyamide 12 unit or a polyamide 11 unit and 85 to 10% by mass of a polyether unit. The polyether-polyamide copolymer (B-3) used in the present invention is preferably a segmented copolymer.

The polyether unit constituting the polyether-polyamide copolymer (B-3) is preferably a polyoxyalkylene oxide unit. The polyoxyalkylene oxide unit preferably consists of an oxyalkylene unit having 2 to 4 carbon atoms and has a molecular weight of 200 to 8,000, specifically including polyethylene oxide, polypropylene oxide, polybutylene oxide (or glycols thereof), etc.

The polyether-polyamide copolymer (B-3) preferably has a melting point or softening point of 175° C. or less, more preferably 170° C. or less. The use of such a polyether-polyamide copolymer (B-3) advantageously further improves dispersibility in the polyamide (A).

As used herein, the softening point is a temperature measured according to JIS K2207 standard.

The polyether-polyamide copolymer (B-3) can be prepared by known processes, for example, by forming a polyamide segment from a polyamide 11-forming component such as undecanelactam or 11-aminoundecanoic acid or a polyamide 12-forming component such as dodecanelactam or 12-aminododecanoic acid and other polyamide-forming components, and polymerizing it with a polyether segment at high temperature under reduced pressure.

Alternatively, the polyether-polyamide copolymer (B-3) is commercially available, and can be appropriately selected from these commercial products.

The copolyamides (B-1) to (B-3) described above (these copolyamides (B-1) to (B-3) are hereinafter sometimes collectively referred to as "polyamide (B)") preferably have a terminal amino group concentration of 1 to 100 μeq/g, more preferably 2 to 50 μeq/g, and a terminal carboxyl group concentration of 1 to 100 μeq/g, more preferably 2 to 50 μeq/g. The polyamide resin having a terminal amino group concentration and a terminal carboxyl group concentration in the ranges above tend to readily react with carbodiimide compounds described below and to have better hydrolysis resistance.

The copolyamide (B) preferably has a number average molecular weight of 15,000 to 35,000. When it has a number average molecular weight in the range above, it has better dispersibility in the polyamide (A) and tends to improve hydrolysis resistance and flexibility. Further, it preferably has a relative viscosity of 1.5 to 4.5, more preferably 1.6 to 4.2, even more preferably 1.8 to 4 when determined at a resin concentration of 1 g/100 cc in 96% sulfuric acid at a temperature of 25° C.

Polyamide resin compositions of the present invention contain 1 to 40 parts by mass of the copolyamide (B) (i.e., a combination of (B-1), (B-2) and (B-3)) per 100 parts by mass of the polyamide resin (A), and if the content is less than 1 part by mass, elongation is not sufficiently improved to provide flexibility, but if it exceeds 40 parts by mass, strength and elastic modulus decrease and water absorption increases. A preferred content is 5 to 35 parts by mass, more preferably 10 to 30 parts by mass.

Polyamide resin compositions of the present invention preferably contain a carbodiimide compound (C). The carbodiimide compound (C) is preferably an aromatic, aliphatic or alicyclic polycarbodiimide prepared by various processes. Among them, aliphatic or alicyclic polycarbodiimide compounds are preferred because of melt kneadability during extrusion or the like, and alicyclic polycarbodiimide compounds are more preferably used.

These carbodiimide compounds (C) can be prepared by decarboxylative condensation of organic polyisocyanates. For example, they can be synthesized by decarboxylative condensation of various organic polyisocyanates at a temperature of about 70° C. or more in an inert solvent or without using a solvent in the presence of a carbodiimidation catalyst. The isocyanate content is preferably 0.1 to 5% by mass, more preferably 1 to 3% by mass. The content in the ranges above helps to facilitate the reaction with the polyamide resin (A) and copolyamide (B) and tends to improve hydrolysis resistance.

Organic polyisocyanates that can be used as starting materials for synthesizing the carbodiimide compounds (C) include, for example, various organic diisocyanates such as aromatic diisocyanates, aliphatic diisocyanates and alicyclic diisocyanates and mixtures thereof.

Examples of organic diisocyanates specifically include 1,5-naphthalene diisocyanate, 4,4-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, methylenebis(4,1-cyclohexylene) diisocyanate and the like, and two or more of them can be used in combination. Among them, dicyclohexylmethane-4,4-diisocyanate and methylenebis(4,1-cyclohexylene)diisocyanate are preferred.

To block the ends of the carbodiimide compounds (C) to control their degree of polymerization, end terminal blocking agents such as monoisocyanates are also preferably used. Monoisocyanates include, for example, phenyl isocyanate, tolyl isocyanate, dimethylphenyl isocyanate, cyclohexyl isocyanate, butyl isocyanate, naphthyl isocyanate and the like, and two or more of them can be used in combination.

The terminal blocking agents are not limited to the monoisocyanates mentioned above, but may be any active hydrogen compounds capable of reacting with isocyanates. Examples of such active hydrogen compounds may include aliphatic, aromatic or alicyclic compounds having an —OH group such as methanol, ethanol, phenol, cyclohexanol, N-methylethanolamine, polyethylene glycol monomethyl ether and polypropylene glycol monomethyl ether; secondary amines such as diethylamine and dicyclohexylamine; primary amines such as butylamine and cyclohexylamine; carboxylic acids such as succinic acid, benzoic acid and cyclohexanecarboxylic acid; thiols such as ethyl mercaptan, allyl mercaptan and thiophenol; compounds having an epoxy group and the like, and two or more of them can be used in combination.

Carbodiimidation catalysts that can be used include, for example, phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and 3-phospholene isomers thereof; metal catalysts such as tetrabutyl titanate and the like, among which 3-methyl-1-phenyl-2-phospholene-1-oxide is preferred because of reactivity. Two or more of the carbodiimidation catalysts may be used in combination.

The content of the carbodiimide compound (C) is 0.1 to 2 parts by mass, preferably 0.2 to 1.5 parts by mass, even more preferably 0.3 to 1.5 parts by mass per 100 parts by mass of the polyamide resin (A). If it is less than 0.1 parts by mass, the resulting resin composition has insufficient hydrolysis resistance so that it is more likely to be unevenly delivered during melt kneading such as extrusion and therefore insufficiently melt-kneaded. If it exceeds 2 parts by mass, however, the viscosity of the resin composition significantly increases during melt kneading, which may deteriorate melt kneadability and moldability.

Polyamide resin compositions of the present invention preferably contain a stabilizer (D). Stabilizers preferably include, for example, organic stabilizers such as phosphorus stabilizers, hindered phenol stabilizers, hindered amine stabilizers, organic sulfur stabilizers, oxalic anilide stabilizers and secondary aromatic amine stabilizers; and inorganic stabilizers such as copper compounds and halides. Phosphorus stabilizers preferably include phosphite compounds and phosphonite compounds.

Phosphite compounds include, for example, distearylpentaerythritol diphosphite, dinonylphenylpentaerythritol diphosphite, bis(2,4-di-t-butylphenyl)pentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(2,6-di-t-butyl-4-isopropylphenyl)pentaerythritol diphosphite, bis(2,4,6-tri-t-butylphenyl)pentaerythritol diphosphite, bis(2,6-di-t-butyl-4-sec-butylphenyl)pentaerythritol diphosphite, bis(2,6-di-t-butyl-4-t-octylphenyl)pentaerythritol diphosphite, bis(2,4-dicumylphenyl)pentaerythritol diphosphite and the like, among which bis(2,6-di-t-butyl-4-methylphenyl)pentaerythritol diphosphite and bis(2,4-dicumylphenyl)pentaerythritol diphosphite are preferred.

Phosphonite compounds include, for example, tetrakis(2,4-di-t-butylphenyl)-4,4'-biphenylene diphosphonite, tetrakis(2,5-di-t-butylphenyl)-4,4'-biphenylene diphosphonite, tetrakis(2,3,4-trimethylphenyl)-4,4'-biphenylene diphosphonite, tetrakis(2,3-dimethyl-5-ethylphenyl)-4,4'-biphenylene diphosphonite, tetrakis(2,6-di-t-butyl-5-ethylphenyl)-4,4'-biphenylene diphosphonite, tetrakis(2,3,4-tributylphenyl)-4,4'-biphenylene diphosphonite, tetrakis(2,4,6-tri-t-butylphenyl)-4,4'-biphenylene diphosphonite and the like, among which tetrakis(2,4-di-t-butylphenyl)-4,4'-biphenylene diphosphonite is preferred.

Hindered phenol stabilizers include, for example, n-octadecyl-3-(3,5-di-t-butyl-4-hydroxyphenyl)propionate, 1,6-hexanediol bis[3-(3,5-di-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-t- butyl-4-hydroxy-5-methylphenyl) propionyloxy}ethyl]-2,4,8,10-tetraoxaspiro[5,5]undecane, triethylene glycol bis[3-(3-t-butyl-5-methyl-4-hydroxyphenyl)propionate], 3,5-di-t-butyl-4-hydroxybenzyl phosphonate diethyl ester, 1,3,5-trimethyl-2,4,6-tris(3,5-di-t-butyl-4-hydroxybenzyl)benzene, 2,2-thio-diethylenebis[3-(3,5-di-t-butyl-4-hydroxyphenyl)propionate], tris(3,5-di-t-butyl-4-hydroxybenzyl)isocyanurate, N,N'-hexamethylenebis(3,5-di-t-butyl-4-hydroxy-hydrocinnamide) and the like. Among them, n-octadecyl-3-(3,5-di-t-butyl-4-hydroxyphenyl)propionate, 1,6-hexanediol bis[3-(3,5-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-t-butyl-4-hydroxy-5-methylphenyl) propionyloxy}ethyl]-2,4,8,10-tetraoxaspiro[5,5]undecane and N,N'-hexamethylenebis(3,5-di-t-butyl-4-hydroxy-hydrocinnamide) are preferred.

Hindered amine stabilizers include, for example, well-known hindered amine compounds having a 2,2,6,6-tetramethylpiperidine skeleton. Specific examples of hindered amine compounds include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-ethylcarbamoyloxy-2,2,6,6-tetramethylpiperidine, 4-cyclohexylcarbamoyloxy-2,2,6,6-tetramethylpiperidine, 4-phenylcarbamoyloxy-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, 1,2-bis(2,2,6,6-tetramethyl-4-piperidyloxy)ethane, α,α'-bis(2,2,6,6-tetramethyl-4-piperidyloxy)-p-xylene, bis(2,2,6,6-tetramethyl-4-piperidyltolylene)-2,4-dicarbamate, bis(2,2,6,6-tetramethyl-4-piperidyl) hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetr amethylpiperidine, the condensation product of 1,2,3,4-butanetetracarboxylic acid and 1,2,2,6,6-pentamethyl-4-piperidinol and β,β,β',β'-tetramethyl-3,9-[2,4,8,10-tetraoxaspiro(5,5)undecane]diethanol, the polycondensation product of dimethyl succinic acid and 1-(2-hydroxyethyl)-4-hydroxy-2,2,6,6-tetramethylpiperidine, 1,3-benzenedicarboxamide-N,N'-bis(2,2,6,6-tetramethyl-4-piperidyl) and the like.

Commercially available hindered amine compounds include the products available from ADEKA CORPORATION under the brand names "ADK STAB LA-52, LA-57, LA-62, LA-67, LA-63P, LA-68LD, LA-77, LA-82, LA-87"; the products available from Ciba Specialty Chemicals Inc. under the brand names "TINUVIN 622, 944, 119, 770, 144"; the product available from Sumitomo Chemical Company under the brand name "SUMISORB 577"; the products available from American Cyanamid Company under the brand names "CYASORB UV-3346, 3529, 3853"; and the product available from Clariant, Japan under the brand name "Nylostab S-EED", etc.

Organic sulfur stabilizers include, for example, organic thioate compounds such as didodecyl thiodipropionate, ditetradecyl thiodipropionate, dioctadecyl thiodipropionate, pentaerythritoltetrakis(3-dodecylthiopropionate) and thiobis(N-phenyl-β-naphthylamine); mercaptobenzimidazole compounds such as 2-mercaptobenzothiazole, 2-mercaptobenzimidazole, 2-mercaptomethylbenzimidazole and metal salts of 2-mercaptobenzimidazole; dithiocarbamate compounds such as metal salts of diethyldithiocarbamic acid and metal salts of dibutyldithiocarbamic acid; and thiourea compounds such as 1,3-bis(dimethylaminopropyl)-2-thiourea and tributylthiourea; as well as tetramethylthiuram monosulfide, tetramethylthiuram disulfide, nickel dibutyl dithiocarbamate, nickel isopropyl xanthate, trilauryl trithiophosphite and the like.

Among them, mercaptobenzimidazole compounds, dithiocarbamate compounds, thiourea compounds and organic thioate compounds are preferred, among which mercaptobenzimidazole compounds and organic thioate compounds are more preferred. Especially, thioether compounds having a thioether structure can be conveniently used because the thioate compounds receive oxygen from oxidized materials to reduce the materials. Specifically, 2-mercaptobenzimidazole, 2-mercaptomethylbenzimidazole, ditetradecyl thiodipropionate, dioctadecyl thiodipropionate and pentaerythritoltetrakis(3-dodecylthiopropionate) are more preferred, among which ditetradecyl thiodipropionate, pentaerythritoltetrakis(3-dodecylthiopropionate) and 2-mercaptomethylbenzimidazole are more preferred, and pentaerythritoltetrakis(3-dodecylthiopropionate) is especially preferred.

The organic sulfur compounds typically have a molecular weight of 200 or more, preferably 500 or more and typically up to 3,000.

Oxanilide stabilizers preferably include 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxanilide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides, mixtures of o- and p-ethoxy-disubstituted oxanilides and the like.

Secondary aromatic amine stabilizers preferably include compounds having a diphenylamine skeleton, compounds having a phenylnaphthylamine skeleton and compounds having a dinaphthylamine skeleton, more preferably compounds having a diphenylamine skeleton and compounds having a phenylnaphthylamine skeleton Specifically, compounds having a diphenylamine skeleton include p,p'-dialkyldiphenylamine (wherein the alkyl group contains 8-14 carbon atoms), octylated diphenylamine, 4,4'-bis(α,α-dimethylbenzyl)diphenylamine, p-(p-toluenesulfonylamide)diphenylamine, N,N'-diphenyl-p-phenylenediamine, N-phenyl-N'-isopropyl-p-phenylenediamine, N-phenyl-N'-(1,3-dimethylbutyl)-p-phenylenediamine and N-phenyl-N'-(3-methacryloyloxy-2-hydroxypropyl)-p-phenylenedi amine; compounds having a phenylnaphthylamine skeleton include N-phenyl-1-naphthylamine and N,N'-di-2-naphtyl-p-phenylenediamine; and compounds having a dinaphthylamine skeleton include 2,2'-dinaphthylamine, 1,2'-dinaphthylamine and 1,1'-dinaphthylamine. Among them, 4,4'-bis(α,α-dimethylbenzyl)diphenylamine, N,N'-di-2-naphtyl-p-phenylenediamine and N,N'-diphenyl-p-phenylenediamine are more preferred, among which N,N'-di-2-naphtyl-p-phenylenediamine and 4,4'-bis(α,α-dimethylbenzyl)diphenylamine are especially preferred.

When the organic sulfur stabilizers or secondary aromatic amine stabilizers mentioned above are contained, they are preferably used in combination. By combining them, the polyamide resin composition tends to have better heat aging resistance as compared with the case in which either one is used.

Preferred combinations of more specific organic sulfur stabilizers and secondary aromatic amine stabilizers include combinations of at least one organic sulfur stabilizer selected from ditetradecyl thiodipropionate, 2-mercaptomethylbenzimidazole and pentaerythritoltetrakis(3-dodecylthiopropionate) and at least one secondary aromatic amine stabilizer selected from 4,4'-bis($\alpha,\alpha$-dimethylbenzyl)diphenylamine and N,N'-di-2-naphtyl-p-phenylenediamine. A combination of an organic sulfur stabilizer consisting of pentaerythritoltetrakis(3-dodecylthiopropionate) and a secondary aromatic amine stabilizer consisting of N,N'-di-2-naphtyl-p-phenylenediamine is more preferred.

When the organic sulfur stabilizers and secondary aromatic amine stabilizers mentioned above are used in combination, the ratio (mass ratio) of the amounts of the secondary aromatic amine stabilizers/organic sulfur stabilizers contained in a polyamide resin composition is preferably 0.05 to 15, more preferably 0.1 to 5, even more preferably 0.2 to 2. By selecting such a content ratio, heat aging resistance can be efficiently improved while maintaining barrier properties.

Inorganic stabilizers preferably include copper compounds and halides.

Copper compounds are copper salts of various inorganic or organic acids excluding the halides described below. Copper may be either cuprous or cupric, and specific examples of copper salts include copper chloride, copper bromide, copper iodide, copper phosphate, copper stearate as well as natural minerals such as hydrotalcite, stichitite and pyrolite.

Halides used as inorganic stabilizers include, for example, alkali metal or alkaline earth metal halides; ammonium halides and quaternary ammonium halides of organic compounds; and organic halides such as alkyl halides and allyl halides, specific examples of which include ammonium iodide, stearyl triethyl ammonium bromide, benzyl triethyl ammonium iodide and the like. Among them, alkali metal halide salts such as potassium chloride, sodium chloride, potassium bromide, potassium iodide and sodium iodide are preferred.

Combinations of copper compounds and halides, especially combination of copper compounds and alkali metal halide salts are preferred because they provide excellent effects in heat allochroism resistance and weatherability (light resistance). For example, when a copper compound is used alone, the molding may be colored in reddish brown by copper, which is not preferred for use in some applications. However, the allochroism in reddish brown can be prevented by combining the copper compound with a halide.

In the present invention, organic sulfur stabilizers, secondary aromatic amine stabilizers and inorganic stabilizers are especially preferred among the stabilizers described above because of processing stability during melt molding, heat aging resistance, molding appearance and coloration prevention.

The content of the stabilizer (D) is typically 0.1 to 1 parts by mass, preferably 0.01 to 0.8 parts by mass per 100 parts by mass of the polyamide resin (A). Heat allochroism and weatherability/light resistance can be sufficiently improved by controlling the content at 0.01 parts by mass or more, while deterioration of mechanical properties can be reduced by controlling the content at 1 part by mass or less.

Polyamide resin compositions of the present invention can further contain other resins than the polyamide resin (A) and copolyamide (B) so far as the benefits of the present invention are not affected. The other resins preferably include resins having a functional group reacting with a carbodiimide group. Specific examples include polyamide resins other than the polyamide resin (A) and copolyamide (B), polyester resins, polycarbonate resins, polyimide resins, polyurethane resins, acrylic resins, polyacrylonitrile, ionomers, ethylene-vinyl acetate copolymers, fluorine resins, vinyl alcohol copolymers such as ethylene-vinyl alcohol, biodegradable resins and the like, and these can be used alone or as a mixture of two or more of them.

Further, polyamide resin compositions of the present invention can further contain inorganic fillers, crystal nucleating agents, conductive agents, lubricants, plasticizers, mold releasability improvers, pigments, dyes, dispersing agents, antistatic agents, UV absorbers, shock resistance improvers and other well-known additives as appropriate so far as the object of the present invention is not affected.

Among others, inorganic fillers are preferably contained, including glass fillers (glass fibers, milled glass fibers (milled fibers), glass flakes, glass beads, etc.), calcium silicate fillers (wollastonite, etc.), mica, talc, kaolin, potassium titanate whiskers, boron nitride, carbon fibers and the like, and two or more of them may be used in combination.

To increase crystallization speed to improve moldability, nucleating agents are also preferably contained. Nucleating agents typically include inorganic nucleating agents such as talc and silicon nitride, but organic nucleating agents may also be added. The amount of the nucleating agents added is preferably 0.01 to 6 parts by mass, more preferably 0.03 to 1 parts by mass in the case of organic nucleating agents and boron nitride or 0.5 to 8 parts by mass, more preferably 1 to 4 parts by mass in the case of talc and other nucleating agents per 100 parts by mass of the polyamide resin (A).

The process for preparing polyamide resin compositions of the present invention is not specifically limited, but they can be prepared by mixing/kneading the polyamide resin (A) and the copolyamide (B) and optionally the carbodiimide compound (C) and other components in any order. Among others, melt-kneading is preferably applied by using various typical extruders such as single or twin-screw extruders, especially preferably twin-screw extruders because of productivity, versatility and the like. In this case, melt-kneading is preferably performed under controlled conditions at a temperature of 200 to 300° C. for a retention time of 10 min or less by using a screw having at least one or more reverse helix screw elements and/or kneading discs on which a blend of materials partially stays. Insufficient extrusion kneading or resin breakdown tends to be less likely to occur by controlling the melt-kneading temperature in the range above.

Compositions having a predetermined component ratio can also be prepared by preliminarily melt-kneading polyamide resin additives at high concentrations to prepare a master batch and then diluting it with the polyamide resin.

Polyamide resin compositions of the present invention can be molded by previously known molding techniques into a wide variety of moldings including various films, sheets, laminated films, laminated sheets, tubes, hoses, pipes, various containers such as hollow containers and bottles, various parts and the like. Films obtained from polyamide resin compositions of the present invention exhibit high-level practical physical properties including a tensile modulus of elasticity of 1000 to 2500 MPa, a tensile elongation of 200 to 500%, oxygen barrier properties of 0.5 to 3.5 cc·mm/m$^2$·day·atm, and a water absorption of 0.1 to 1.0%.

Typical film-forming techniques for preparing a film or sheet include the flat-die extrusion method in which a film- or sheet-like material extruded from a flat die is cooled by casting on a chilled roll; the blown-film extrusion method in which a tubular material is extruded from a die having an annular slit and expanded by blowing air into the tube and cooled with air or water to form a film; and the like. The film/sheet formed in this manner is used as unstretched or as a stretched film/sheet after it undergoes a stretching process such as uniaxial or biaxial stretching.

The film/sheet may be a single layer or may be coextruded or laminated or otherwise combined with other resins to form a multilayer structure.

The thickness of the film/sheet is not specifically defined, but the thickness as a single polyamide resin layer is preferably 2 to 100 μm when it is unstretched or 2 to 50 μm when it has been stretched, and the thickness as a multilayer film/sheet assembly is about 10 to 300 μm in which the thickness of the polyamide resin layer is preferably in a range similar to the thickness as a single layer indicated above.

The process for preparing a polyamide tube is not specifically limited, but it can be prepared by known techniques. For example, the dry blend or pellets obtained by melt-kneading may be fed to a tube extruder and molded according to routine. Molding conditions are not specifically limited, either, and typical molding temperatures for polyamide resins can be applied. The wall thickness of a tube is preferably 0.1 mm to 2 mm. If the wall thickness is less than 0.1 mm, a tubular shape cannot be kept, but if the wall thickness exceeds 2 mm, the product becomes rigid and loses flexibility as a tube so that it unfavorably becomes difficult to install.

Polyamide resin compositions of the present invention can also provide single layer or multilayer structures having excellent hydrolysis resistance, barrier properties, flexibility, strength and shock resistance. Multilayer structures are preferably multilayer moldings comprising at least one layer consisting of a polyamide resin composition of the present invention and at least one reinforcing layer consisting of a polyolefin resin, a polystyrene resin, a polyester resin, a polycarbonate resin, a polyamide resin other than the polyamide resin composition of the present invention, a fluorine resin or the like especially because of the strength of the moldings.

Examples of polyolefin resins used as reinforcing layers may include linear low density polyethylene, low density polyethylene, medium density polyethylene, high density polyethylene, ultra high molecular weight high density polyethylene, polypropylene, or copolymers of two or more selected from ethylene, propylene, butane and the like, and mixtures thereof. The polyolefin resin, polystyrene resin, polyester resin, polycarbonate resin, polyamide resin other than the polyamide resin composition of the present invention and fluorine resin listed above as examples of the reinforcing layer may be used as a mixture thereof or may be used as a mixture with other resins such as elastomers or additives such as, for example, carbon black or flame-retardants.

EXAMPLES

The following examples further illustrate the present invention, but the present invention should not be construed as being limited to the following examples/comparative examples.

[Materials Used]

The polyamide resins prepared in the following preparation examples were used as polyamide resins (A) in the present invention.

Preparation Example 1

Synthesis of poly-m-xylylene sebacamide (MXD10)

In a reaction vessel, sebacic acid (TA grade available from Itoh Oil Chemicals Co., Ltd.) was melted by heating at 170° C. and then the temperature was raised to 240° C. while m-xylylenediamine (MXDA from Mitsubishi Gas Chemical Company, Inc.) was gradually added dropwise in a molar ratio of 1:1 to sebacic acid while stirring the contents. After completion of the dropwise addition, the temperature was raised to 260° C. After completion of the reaction, the contents were collected in the form of strands and pelletized in a pelletizer. The resulting pellets were placed in a tumbler and solid-state polymerized under reduced pressure to give a polyamide resin having a controlled molecular weight.

The polyamide resin (MXD10) had a melting point of 191° C., a glass transition point of 60° C., a number average molecular weight of 30,000, and an oxygen transmission rate of 0.8 cc·mm/m$^2$·day·atm as determined by the methods described below.

This polyamide resin is hereinafter abbreviated as "MD10".

Preparation Example 2

Synthesis of poly(p-xylylene sebacamide) (PXD10)

A reaction vessel equipped with a stirrer, a partial condenser, a total condenser, a thermometer, a dropping device and a nitrogen inlet as well as a strand die was charged with precisely weighed 8950 g (44 mol) of sebacic acid (TA grade available from Itoh Oil Chemicals Co., Ltd.), 13.7401 g of sodium hypophosphite monohydrate (300 ppm expressed as the phosphorus atom concentration in the polyamide resin), and 10.6340 g of sodium acetate. The molar ratio between sodium hypophosphite and sodium acetate is 1.0. The reaction vessel was thoroughly purged with nitrogen and then pressurized with nitrogen to 0.3 MPa and heated to 160° C. with stirring to homogeneously melt sebacic acid.

Then, 6026 g (44 mol) of p-xylylenediamine (PXDA) was added dropwise with stirring over 170 min. During then, the internal temperature was continuously raised to 281° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of p-xylylenediamine, the pressure was lowered at a rate of 0.4 MPa/hr to atmospheric pressure over 60 min. During then, the internal temperature rose to 299° C. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 10 min. Then, the inside of the system was pressurized with nitrogen, and the polymer was collected from the strand die and pelletized to give a polyamide resin. The resulting polyamide resin PXD10 had a melting point of 290° C. and a glass transition point of 75° C. It had a number average molecular weight of 25000, and an oxygen transmission rate of 2.5 cc·mm/m$^2$·day·atm.

This polyamide resin is hereinafter abbreviated as "PXD10".

Preparation Example 3

Synthesis of poly (m-/p-xylylene sebacamide) (MPXD10-1)

A polyamide resin was obtained in the same manner as in Preparation example 1 except that m-xylylenediamine was replaced by a 3:7 mixture (molar ratio) of m-xylylenediamine and p-xylylenediamine and the temperature was raised to 260° C. while the xylylenediamine mixture was gradually added dropwise in a molar ratio of 1:1 to sebacic acid, and after completion of the dropwise addition, the temperature was raised to 280° C.

The polyamide resin (MPXD10-1) had a melting point of 258° C., a glass transition point of 70° C., a number average molecular weight of 20,000, and an oxygen transmission rate of 2 cc·mm/m$^2$·day·atm as determined by the methods described below.

This polyamide resin is hereinafter abbreviated as "MPXD10-1".

Preparation Example 4

Synthesis of poly(m-/p-xylylene sebacamide) (MPXD10-2)

A polyamide resin was obtained in the same manner as in Preparation example 1 except that m-xylylenediamine was replaced by a 7:3 mixture (molar ratio) of m-xylylenediamine and p-xylylenediamine.

The polyamide resin (MPXD10-2) had a melting point of 215° C., a glass transition point of 63° C., a number average molecular weight of 28,000, and an oxygen transmission rate of 1.4 cc·mm/m$^2$·day·atm as determined by the methods described below.

This polyamide resin is hereinafter abbreviated as "MPXD10-2".

The following polyamides (B-1), (B-2) and (B-3) were used as copolyamides (B) in the present invention.
(B-1) Copolyamide 6/66/12

The product available from UBE Industries Inc. under the brand name "UBE Nylon 6434B" having a melting point of 190° C., a glass transition point of 44° C. and a relative viscosity of 4.05 (determined at a resin concentration of 1 g/100 cc in 96% sulfuric acid at a temperature of 25° C.).

This polyamide resin is hereinafter abbreviated as "6/66/12".
(B-2) Copolyamide 6/66/11

A 70 L autoclave was charged with 17 kg of ε-caprolactam, 6 kg of a 50% aqueous solution of hexamethylene ammonium adipate salt, and 1 kg of aminoundecanoic acid, and the inside of the polymerization tank was purged with nitrogen and then the tank was closed and heated to 180° C., and then the temperature in the polymerization tank was raised to 240° C. while controlling the pressure in the polymerization tank at 17.5 kgf/cm$^2$G with stirring. Two hours after the polymerization temperature reached 240° C., the pressure in the polymerization tank was released to atmospheric pressure over about 2 hrs. After the pressure was released, polymerization took place under a nitrogen stream for 1 hr and then under reduced pressure for 2 hrs. The pressure was returned to atmospheric pressure by introducing nitrogen, and then the stirrer was stopped and the contents were collected in the form of strands and pelletized, and extracted with boiling water to remove unreacted monomers and dried. The resulting copolyamide had a relative viscosity of 3.8 (determined at a resin concentration of 1 g/100 cc in 96% sulfuric acid at a temperature of 25° C.).

This polyamide resin is hereinafter abbreviated as "6/66/11".
(B-3) Polyether-Polyamide 12 Copolymer The product available from UBE Industries Inc. under the brand name "UBESTA XPA 9055X1" having a Shore D hardness of 55 and a melting point of 164° C.

This polyamide resin is hereinafter abbreviated as "PE/N12".

Other Polyamide Resin Components:
Polyamide 6/66

The product available from UBE Industries Inc. under the brand name "Ube Nylon 5033B" having a melting point of 196° C., a glass transition point of 46° C. and a relative viscosity of 4.08 (determined at a resin concentration of 1 g/100 cc in 96% sulfuric acid at a temperature of 25° C.).

This polyamide resin is hereinafter abbreviated as "N6/66".
Polyamide 6

The product available from UBE Industries Inc. under the brand name "Ube Nylon 1022B" having a melting point of 220° C., a glass transition point of 45° C., a number average molecular weight of 22,000 and a relative viscosity of 3.37 (determined at a resin concentration of 1 g/100 cc in 96% sulfuric acid at a temperature of 25° C.).

This polyamide resin is hereinafter abbreviated as "N6".
Polyamide 11

The product available from Arkema under the brand name "Rilsan BESN OTL" having a melting point of 188° C., a glass transition point of 40° C., and a number average molecular weight of 27,000. This polyamide resin is hereinafter abbreviated as "N11".
Polyamide 12

The product available from UBE Industries Inc. under the brand name "UBESTA3030U" having a melting point of 178° C., a glass transition point of 50° C., and a number average molecular weight of 30,000.

This polyamide resin is hereinafter abbreviated as "N12".
Carbodiimide Compound (C) Component:

An alicyclic polycarbodiimide compound available from Nisshinbo under the brand name "Carbojilite LA-1".

This carbodiimide compound is hereinafter abbreviated as "carbodiimide".

Modified Elastomer Component:

A maleic acid-modified ethylene-propylene copolymer available from Mitsui Chemicals, Inc. under the brand name "TAFMER MP0610". This is hereinafter abbreviated as "modified EPR".

Stabilizer:

A copper chloride/potassium iodide mixture in a copper chloride:potassium iodide ratio=1:10 (mass ratio).

This is hereinafter abbreviated as "CuCl/KI".

Examples 1 to 5 and Comparative Examples 1 to 8

The components described above were dry-blended in the proportions shown in Table 1 and Table 2 below (all expressed in parts by mass) and the resulting dry blends were fed to a twin-screw extruder having a cylinder diameter of 37 mm and equipped with high shear screws having kneading discs through a weighing feeder at a speed of 15 kg/hr. The blends were melted and kneaded under conditions of a cylinder temperature of 230° C. and a screw rotating speed of 100 rpm and the resulting molten strands were solidified by cooling with cold air and then pelletized to prepare pellets of polyamide resin compositions.

The pellets obtained above were fed to a twin-screw extruder having a cylinder diameter of 30 mm and equipped with a flat die (PTM-30 available from Research Laboratory of Plastics Technology Co., Ltd.) through a weighing feeder at a speed of 1.2 kg/hr. The materials were conveyed under conditions of a cylinder temperature of 230° C. and a screw rotating speed of 50 rpm and then forced through the flat die into film-like materials, which were taken up at a speed of 2.7 m/min and cooled on a chilled roll at 60° C. to give films having a thickness of 100 μm.

The resulting films were subjected to various evaluations described below.

Evaluation results are shown in Tables 1 and 2.

Examples 6 to 8

Evaluations were performed in the same manner as in Example 1 except that pellets of polyamide resin compositions were prepared by controlling the cylinder temperature at the melting point of each polyamide resin plus 25° C. during the preparation of the pellets and that films were prepared by controlling the cylinder temperature at the melting point of each polyamide resin plus 25° C. during the preparation of the films.

Evaluation results are shown in Table 1.

[Evaluation Methods]

In the Examples and Comparative examples, analysis/evaluation methods are as follows.

(1) Gas Barrier Properties (Expressed in cc·mm/m²·day·atm)

The oxygen transmission rate (cc·mm/m²·day·atm) of each film was determined according to JIS K7126 in an atmosphere of 23° C., 75% RH using OX-TRAN 2/21 available from Modern Controls, Inc. Lower values show better gas barrier properties.

(2) Melting Point and Glass Transition Point of Polyamides (Expressed in ° C.)

Melting point and glass transition point were determined by differential scanning calorimetry (DSC) using DSC-60 available from SHIMADZU CORPORATION under analytical conditions as follows: a specimen of about 5 mg is heated from 30 to 300° C. at a rate of 10° C./min, held at 300° C. for 2 min, then cooled to 30° C. at a rate of 20° C./min, and then heated at a rate of 10° C./min.

(3) Number Average Molecular Weight

Number average molecular weight was determined as PMMA by GPC using HLC-8320GPC available from Tosoh Corporation on TSKgel SuperHM-H columns in hexafluoroisopropanol (HFIP) containing 10 mmol/l sodium trifluoroacetate as eluent at a temperature of 40° C. A calibration curve was prepared for six PMMA standards dissolved in HFIP. The number average molecular weights of N6, N11 and N12 are nominal values specified by the manufactures.

(4) Haze (Expressed in %)

The haze of each film was determined according to ASTM D1003 using Color & Haze Measuring Instruments COH-300A available from Nippon Denshoku Ind.

(5) Water Absorption (Expressed in %)

A film specimen was immersed in distilled water under conditions of 23° C. for 24 hrs and then moisture on the surface was wiped off, after which the specimen was heated to a temperature 10° C. lower than the melting point of the primary component resin and water absorption was measured by Karl Fischer Moisture Meter.

(6) Tensile Modulus of Elasticity (Expressed in MPa)

Tensile properties of each film were tested according to JIS K7127 and K7161 to determine tensile modulus of elasticity (MPa) using Strograph available from Toyo Seiki Kogyo Co., Ltd. under the following conditions: specimen width 10 mm, distance between chucks 50 mm, tensile speed 50 mm/min, test temperature 23° C. and test humidity 50% RH.

(7) Tensile Elongation (Expressed in %)

Tensile properties of each film were tested according to JIS K7127 and K7161 to determine tensile strain at break or nominal tensile strain at break or nominal tensile strain at tensile strength of the film and report the value as tensile elongation. Strograph available from Toyo Seiki Kogyo Co., Ltd. was used under the following conditions: specimen width 10 mm, distance between chucks 50 mm, tensile speed 50 mm/min, test temperature 23° C. and test humidity 50% RH.

(8) Hydrolysis Resistance/Heat Aging Resistance (Expressed in %)

First, a film specimen was heat-treated at 110° C. for 48 hrs by a hot air dryer. Then, it was treated in boiling water (100° C.) for 24 hrs. Tensile properties of the film before and after the treatment were tested according to JIS K7127 and K7161 to determine stress at break (MPa) using Strograph available from Toyo Seiki Kogyo Co., Ltd. under the following conditions: specimen width 10 mm, distance between chucks 50 mm, tensile speed 50 mm/min, test temperature 23° C. and test humidity 50% RH.

Tensile strength retention (%) was calculated as the ratio between the stresses at break before and after the heat treatment by equation (1) below. The higher this tensile strength retention, the higher the hydrolysis resistance/heat aging resistance.

Tensile strength retention(%)=[Stress at break of a film after heat treatment(MPa)/Stress at break of the film before heat treatment(MPa)]×100　　(1)

TABLE 1

| Components | Examples | | | | | | | |
|---|---|---|---|---|---|---|---|---|
| | 1 | 2 | 3 | 4 | 5 | 6 | 7 | 8 |
| MXD10 | 100 | 100 | 100 | 100 | 100 | | | |
| PXD10 | | | | | | 100 | | |
| MPXD10-1 | | | | | | | 100 | |
| MPXD10-2 | | | | | | | | 100 |
| 6/66/12 | 11 | 25 | 11 | 11 | | 35 | 20 | 5 |
| 6/66/11 | | | | | 25 | | | |
| Carbodiimide | | | 1 | | | | 0.5 | |
| CuCl/KI | | | | 0.2 | | | 0.1 | |
| Modulus of elasticity (MPa) | 1902 | 1515 | 1900 | 1905 | 1520 | 1050 | 1724 | 2050 |
| Tensile elongation (%) | 390 | 287 | 380 | 385 | 290 | 290 | 292 | 300 |

TABLE 1-continued

|  | Examples | | | | | | | |
|---|---|---|---|---|---|---|---|---|
| Components | 1 | 2 | 3 | 4 | 5 | 6 | 7 | 8 |
| Gas barrier properties (cc · mm/m² · day · atm) | 1.0 | 1.3 | 1.0 | 1.0 | 1.3 | 3.3 | 2.6 | 1.6 |
| Water absorption (%) | 0.20 | 0.25 | 0.20 | 0.20 | 0.26 | 0.40 | 0.22 | 0.18 |
| Haze (%) | 8.61 | 9.49 | 8.50 | 8.60 | 9.30 | 10.2 | 9.00 | 6.60 |
| Hydrolysis resistance/heat aging resistance (%) | 80 |  | 105 | 102 |  |  | 101 |  |

TABLE 2

|  | Comparative examples | | | | | | | |
|---|---|---|---|---|---|---|---|---|
| Components | 1 | 2 | 3 | 4 | 5 | 6 | 7 | 8 |
| MXD10 | 100 | 100 | 100 | 100 | 100 | 100 |  |  |
| 6/66/12 |  | 43 |  |  |  |  |  |  |
| 6/66/11 |  |  |  |  |  |  |  |  |
| N11 |  |  |  |  | 50 |  |  |  |
| N6 |  |  |  |  |  |  | 100 |  |
| N6/66 |  |  | 11 | 25 |  |  |  |  |
| Modified EPR |  |  |  |  | 50 |  |  |  |
| N12 |  |  |  |  |  | 11 |  | 100 |
| Carbodiimide |  |  |  |  |  |  |  |  |
| CuCl/KI |  |  |  |  |  |  |  |  |
| Modulus of elasticity (MPa) | 1983 | 740 | 1850 | 1800 | 800 | 18600 | 800 | 600 |
| Tensile elongation (%) | 124 | 300 | 130 | 140 | 460 | 150 | 440 | 250 |
| Gas barrier properties (cc · mm/m² · day · atm) | 0.9 | 1.5 | 1.0 | 1.2 | 5.0 |  | 2.7 | 18 |
| Water absorption (%) | 0.18 | 0.30 | 0.25 | 0.30 |  | 0.18 | 1.70 | 0.20 |
| Haze (%) | 0.90 | 12 | 8.0 | 9.0 | 100 | 35 | 0.80 | 1.00 |
| Hydrolysis resistance/heat aging resistance (%) | 60 |  |  |  |  |  |  |  |

As shown from Table 1 and Table 2 above, the films of Examples 1 to 8 containing specific amounts of the copolyamide 6/66/12 or 6/66/11 in addition to xylylene sebacamide are very soft films exhibiting tensile elongation 2 to 3 times or more higher than that of Comparative example 1 not containing it while maintaining high level of elasticity, i.e., they have rigidity and flexibility at the same time. It is also shown that the film of Comparative example 2 containing more than 40 parts by mass of the copolyamide 6/66/12 exhibits a significant decrease in elasticity to a half or less of those of the films not containing it as well as a significant decrease in gas barrier properties and an increase in water absorption.

It is shown that Comparative examples 3 and 4 using the polyamide 6/66 as a copolyamide do not exhibit tensile elongation as high as those of the Examples. It is also shown that when other polyamides were contained, tensile elongation was poor (Comparative example 6) or transparency (haze) was poor (Comparative examples 5, 7 and 8) or haze was poor and elasticity decreased to a half when modified EPR was contained (Comparative example 5).

Moreover, a comparison between Examples 1 to 8 and Examples 9 and 10 (Table 3 below) shows that the films containing specific amounts of the copolyamide 6/66/12 or 6/66/11 have excellent transparency as proved by a significant decrease in haze as compared with the films containing specific amounts of the polyether-polyamide copolymer.

Examples 9 and 10 and Comparative Examples 9 to 12

The components described above were dry-blended in the proportions shown in Table 3 below (all expressed in parts by mass) and fed to a single screw extruder having a cylinder diameter of 30 mm and equipped with a flat die (PTM-30 available from PLABOR Research Laboratory of Plastics Technology Co., Ltd.). The blends were melted and kneaded under conditions of a cylinder temperature of 260° C. and a screw rotating speed of 30 rpm and then forced through the flat die into film-like materials, which were cooled on a chilled roll to give films having a thickness of 100

Examples 11 to 13

The components described above were dry-blended in the proportions shown in Table 3 below (all expressed in parts by mass) and fed to a single screw extruder having a cylinder diameter of 30 mm and equipped with a flat die (PTM-30 available from PLABOR Research Laboratory of Plastics Technology Co., Ltd.). The blends were melted and kneaded under conditions of a cylinder temperature controlled at the melting point of each polyamide resin plus 25° C. and a screw rotating speed of 30 rpm and then forced through the flat die into film-like materials, which were cooled on a chilled roll to give films having a thickness of 100 μm.

TABLE 3

| Components | Examples 9 | 10 | 11 | 12 | 13 | Comparative examples 9 | 10 | 11 | 12 |
|---|---|---|---|---|---|---|---|---|---|
| MXD10 | 100 | 100 | | | | 100 | | | |
| PXD10 | | | 100 | | | | 100 | | |
| MPXD10-1 | | | | 100 | | | | 100 | |
| MPXD10-2 | | | | | 100 | | | | 100 |
| PE/N12 | 11.1 | 25 | 10 | 20 | 5 | | | | |
| Carbodiimide | 1 | | 0.3 | | | | | | |
| CuCl/KI | | | 0.1 | | | | | | |
| Tensile modulus of elasticity (MPa) | 1800 | 1600 | 1862 | 1689 | 1985 | 2000 | 1875 | 1912 | 2030 |
| Tensile elongation (%) | 300 | 340 | 272 | 314 | 301 | 120 | | | |
| Water absorption (%) | 0.29 | 0.28 | 0.29 | 0.28 | 0.3 | 0.18 | | | |
| Gas barrier properties (cc · mm/m² · day · atm) | 1.7 | 1.9 | 1.8 | 2.6 | 1.5 | 1.5 | 2.6 | 2 | 1.5 |
| Haze (%) | 72 | 83 | 69 | 79 | 50 | 0.9 | 0.89 | 0.91 | 0.93 |

As shown from Table 3 above, the films of the Examples containing specific amounts of the polyether-polyamide copolymer in addition to xylylene sebacamide are very soft films exhibiting tensile elongation 2 to 3 times or more higher than that of Comparative example 9 not containing it while maintaining high level of elasticity, i.e., they have rigidity and flexibility at the same time.

INDUSTRIAL APPLICABILITY

Polyamide resin compositions of the present invention are polyamide resin materials having high elastic modulus, good gas barrier properties, low water absorption, flexibility and excellent transparency so that they can be conveniently used for a wide variety of moldings including various films, sheets, laminated films, laminated sheets, tubes, hoses, pipes, various containers such as hollow containers and bottles, various parts and the like.

The invention claimed is:

1. A polyamide resin composition, comprising:
   a polyamide resin (A) comprising a diamine structural unit and a dicarboxylic acid structural unit; and
   1 to 40 parts by mass of a copolyamide (B) per 100 parts by mass of the polyamide resin (A),
   wherein at least 70 mol % of the diamine structural unit is derived from xylylenediamine,
   at least 50 mol % of the dicarboxylic acid structural unit is derived from sebacic acid,
   the copolyamide (B) is selected from the group consisting of (B-1)-(B-3),
   (B-1) is a copolyamide 6/66/12,
   (B-2) is a copolyamide 6/66/11, and
   (B-3) is a polyether-polyamide copolymer comprising a polyamide 12 unit or a polyamide 11 unit, and a polyether unit.

2. The polyamide resin composition of claim 1, wherein a film made from the polyamide resin composition has a tensile modulus of elasticity (E), which is from 70 to 97% of a tensile modulus of elasticity ($E_A$) of a film made from the polyamide resin (A).

3. The polyamide resin composition of claim 1, wherein the xylylenediamine is m-xylylenediamine, p-xylylenediamine, or a mixture thereof.

4. The polyamide resin composition of claim 3, wherein the xylylenediamine is a mixture of from 0 to 50% of m-xylylenediamine and from 50 to 100 mol % of p-xylylenediamine.

5. The polyamide resin composition of claim 3, wherein the xylylenediamine is a mixture of from 50 to 100% of m-xylylenediamine and from 0 to 50 mol % of p-xylylenediamine.

6. The polyamide resin composition of claim 1, wherein the polyamide resin (A) is a polyamide resin obtained by a process comprising polycondensing m-xylylenediamine, p-xylylenediamine, or a mixture thereof with sebacic acid.

7. The polyamide resin composition of claim 6, wherein the polyamide resin (A) comprises a sebacic acid component in an amount of 50 mol % or more of the polyamide resin (A).

8. The polyamide resin composition of claim 6, wherein the polyamide resin (A) comprises a sebacic acid component in an amount of 80 mol % or more of the polyamide resin (A).

9. The polyamide resin composition of claim 1, further comprising 0.1 to 2 parts by mass of a carbodiimide compound (C) per 100 parts by mass of the polyamide resin (A).

10. The polyamide resin composition of claim 9, wherein the carbodiimide compound (C) is an aliphatic or alicyclic polycarbodiimide compound.

11. The polyamide resin composition of claim 9, wherein the carbodiimide compound (C) is included in an amount of from 0.3 to 1.5 parts by mass per 100 parts by mass of the polyamide resin (A).

12. The polyamide resin composition of claim 1, further comprising 0.01 to 1 parts by mass of a stabilizer (D) per 100 parts by mass of the polyamide resin (A).

13. The polyamide resin composition of claim 12, wherein the stabilizer (D) is selected from the group consisting of an inorganic stabilizer, a secondary aromatic amine stabilizer, and an organic sulfur stabilizer.

14. The polyamide resin composition of claim 12, wherein the stabilizer (D) is included in an amount of from 0.01 to 0.8 parts by mass per 100 parts by mass of the polyamide resin (A).

15. The polyamide resin composition of claim 14, wherein the stabilizer (D) comprises at least one of copper chloride, copper bromide, copper iodide, copper phosphate, copper stearate, potassium chloride, sodium chloride, potassium bromide, potassium iodide and sodium iodide.

16. The polyamide resin composition of claim 15, wherein the copolyamide (B) is included in an amount of 10 to 30 parts by mass.

17. The polyamide resin composition of claim 16, wherein the copolyamide (B) has a terminal amino group concentration of 2 to 50 µeq/g and a terminal carboxyl group concentration of 2 to 50 µeq/g.

18. A molded article obtained by a process comprising molding the polyamide resin composition of claim 1.

19. The molded article of claim 18, wherein the molded article is a film, sheet, or tube.

20. The molded article of claim 19, wherein the molded article is a film, and the film has a tensile modulus of elasticity (E) from 70 to 97% of a tensile modulus of elasticity ($E_A$) of a film made from the polyamide resin (A).

* * * * *